J. H. SANDERSON.
Vehicle-Spring.

No. 216,352.                Patented June 10, 1879.

UNITED STATES PATENT OFFICE.

JOHN H. SANDERSON, OF GREENFIELD, MASSACHUSETTS, ASSIGNOR OF ONE-HALF HIS RIGHT TO HENRY W. WARNER, OF SAME PLACE.

IMPROVEMENT IN VEHICLE-SPRINGS.

Specification forming part of Letters Patent No. 216,352, dated June 10, 1879; application filed April 3, 1879.

*To all whom it may concern:*

Be it known that I, JOHN H. SANDERSON, of Greenfield, in the county of Franklin and Commonwealth of Massachusetts, have invented a new and useful Improvement in Springs for Vehicles, of which the following is a specification.

This invention relates more especially to those springs known as "elliptic" and "semi-elliptic."

Elliptic springs have long been known and used, generally composed of two or more leaves, forming a series, placed one on the other, and the ends being confined by a shackle or eye and pin, the elasticity or spring to the vehicle and rider was obtained from these leaves.

In springs for children's carriages, the springs have been made in the same general style, but with only a single leaf for the upper and lower half each, or, as a semi-elliptic, sustained from the rocker-frame forward and the axle behind.

My invention consists of a spring formed of two plates, adapted to bear between the blocks of a carriage, which are united at their ends by curved auxiliary springs secured thereto, as will be hereinafter fully described.

This spring is made in form nearly circular, and as it is shorter it can be more readily tempered than the longer leaves, and is to be made of finer steel and thinner than the long or main leaves.

The auxiliary spring being more finely tempered and more elastic, the long leaf or leaves may be stiffer, and yielding only in a small degree.

Especially is this the case in the springs for children's carriages, which must be made cheap and light. The auxiliary spring gives all the elasticity necessary, and the long springs may be made of cheaper steel, merely chilled.

Figure 1:
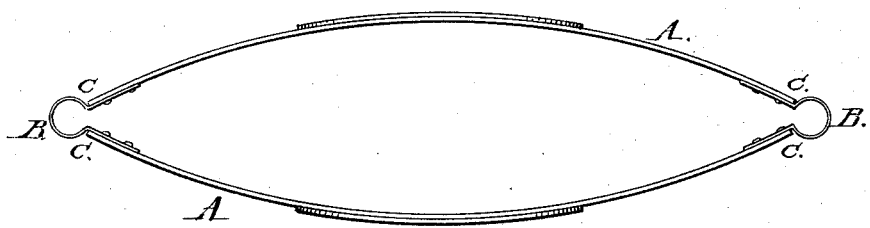
Figure 2:
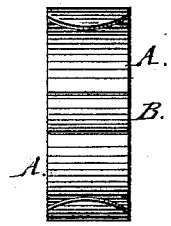

In the drawings, Figure 1 represents a front upright view of the entire spring; Fig. 2, an end elevation of same.

A A' are the main portions of an elliptic spring. B B' are the auxiliary springs, riveted to the main springs at C.

What I claim as my invention is—

In an elliptic spring for carriages, the combination of the two plates A A with the auxiliary springs B B, as and for the purpose specified.

JOHN H. SANDERSON.

Witnesses:
   JAMES S. GRINNELL,
   WM. H. ALLEN.